United States Patent [19]
Soodalter

[11] 3,782,607
[45] Jan. 1, 1974

[54] DISPENSING MACHINE FOR FOOD PRODUCTS

[76] Inventor: Arnold Soodalter, 134 Tanglewood Dr., Longmeadow, Mass. 01106

[22] Filed: Feb. 1, 1972

[21] Appl. No.: 222,559

Related U.S. Application Data

[63] Continuation-in-part of Ser. No. 126,850, March 22, 1971, abandoned.

[52] U.S. Cl. .............................. 222/249, 222/267
[51] Int. Cl. ............................................ G01f 11/04
[58] Field of Search ................... 222/275, 249, 340, 222/363, 368, 267

[56] References Cited
UNITED STATES PATENTS 2,292,196   8/1942   Brynoldt ........................ 222/219
1,676,377   7/1928   Bergmann ..................... 222/219 X Primary Examiner—Stanley H. Tollberg
Attorney—Kenwood Ross et al.

[57] ABSTRACT

Apparatus for dispensing a portioned food product comprising a product supply and pressure means including a chamber for the food product, primary and secondary rams for exerting pressure upon the food product, product metering means communicating with the chamber and aligned with at least one of the primary and secondary rams for accepting a measured amount of the food product expressed from the chamber, and means for ejecting the measured amount of food product from the metering means.

2 Claims, 7 Drawing Figures

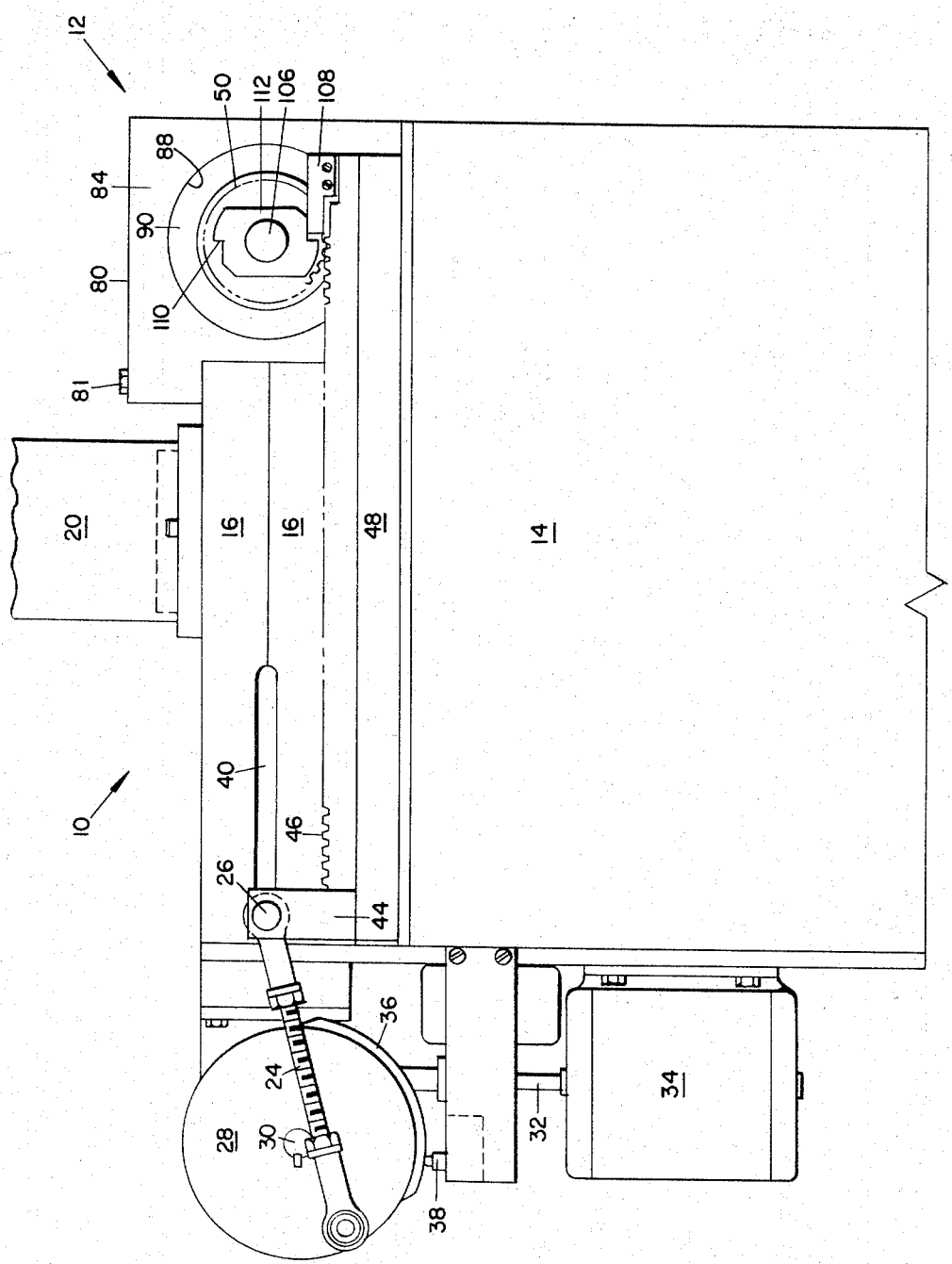

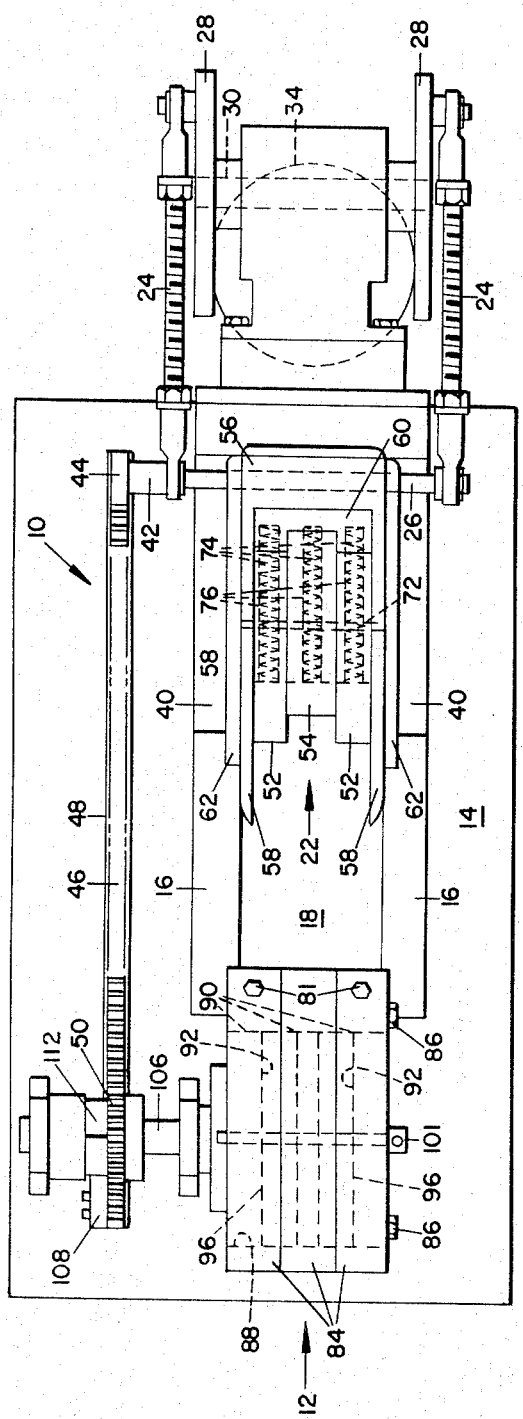
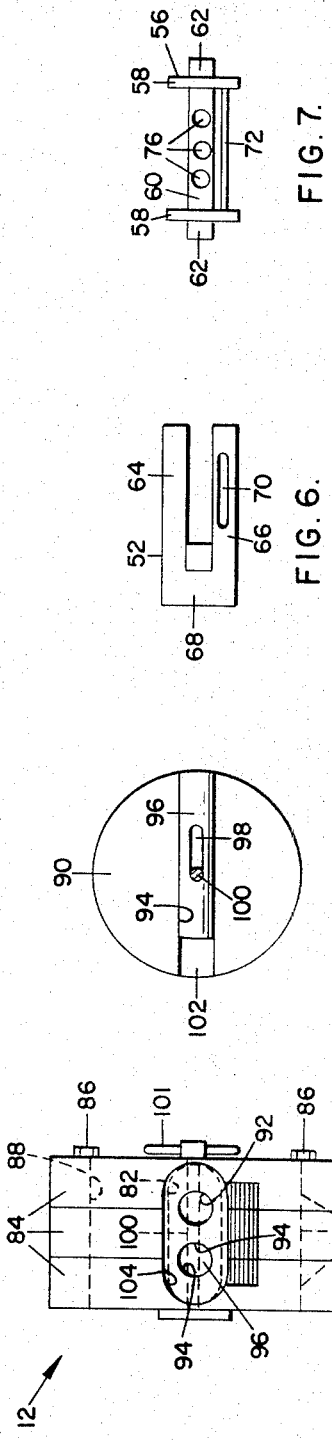

DISPENSING MACHINE FOR FOOD PRODUCTS

This application is a continuation-in-part of my copending application Ser. No. 126,850 filed Mar. 22, 1971, now abandoned.

The invention provides a simple, inexpensive and accurate device for dispensing a predetermined amount of food product, with food supplying and food metering instrumentalities operating in consort toward this end.

In addition, a novel arrangement of primary and secondary rams is taught for ejecting the food product from the supply and pressure means to the metering means which dispenses the food product in precise desired size and/or weight and/or amount.

The apparatus may optionally incorporate a product forming means for accepting a measured amount of the food product and for imparting such as a spherical or other desired shape thereto.

In the drawings:

FIG. 2 is a rear elevational view thereof;

FIG. 3 is a top plan view thereof with portions omitted for purposes of clarity;

FIG. 4 is an end elevational view of the product metering means thereof;

FIG. 5 is a front elevational view of a portion of the product metering means of FIG. 4;

FIG. 6 is a front elevational view of a portion of the pressure means for exerting pressure on the food product; and FIG. 7 is an end elevational view of another portion of the pressure means.

Figure 1:
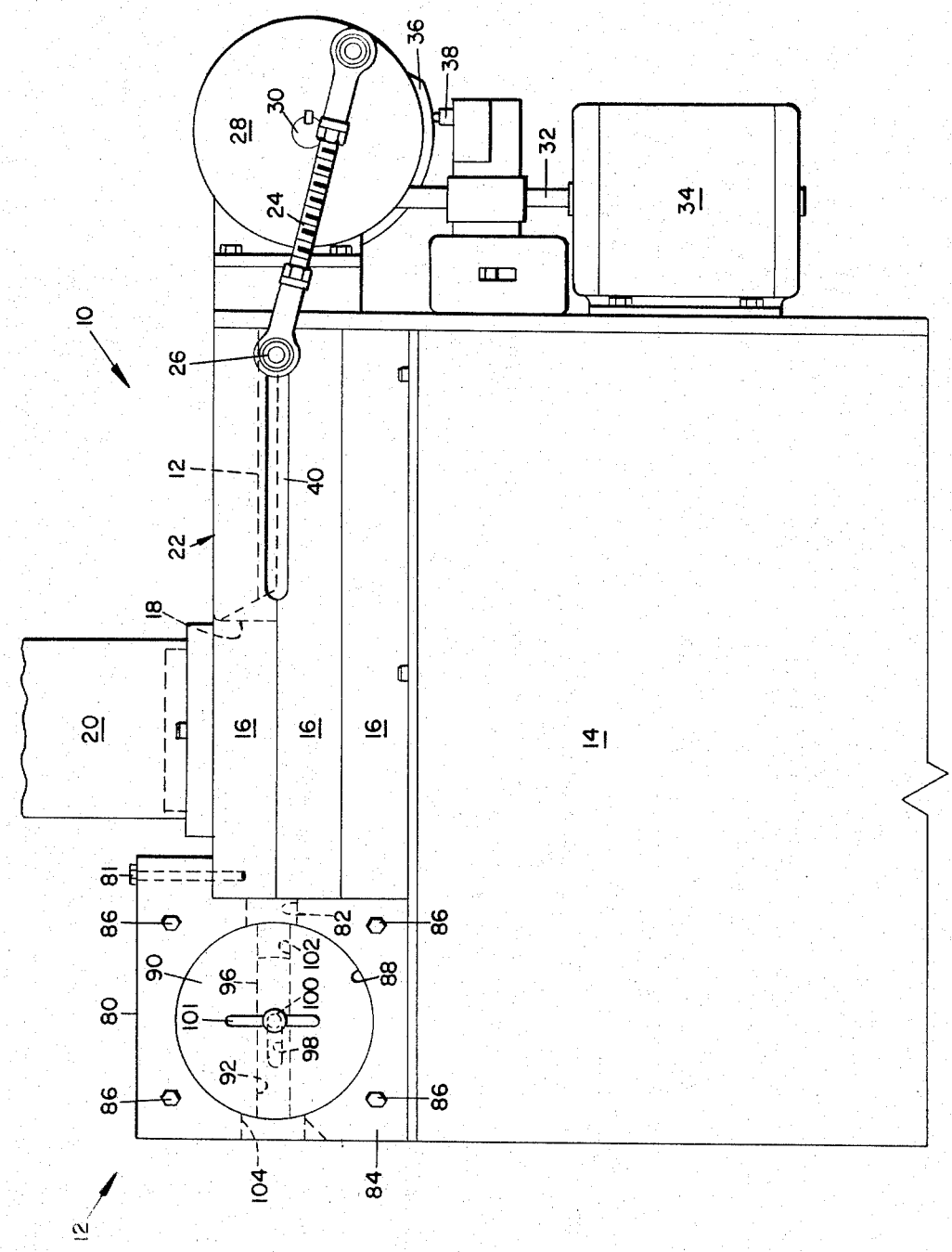
FIG. 1 is a front elevational view of a dispensing machine of the invention.

The dispensing machine generally comprises cooperating instrumentalities including, a product supply and pressure means 10, and a product metering means 12, each disposed above a common base 14 and working unisonly to the end that a food product, such as meat or dough or the like, or even a viscous product of predetermined size, and/or shape and/or amount, is obtained.

THE PRODUCT SUPPLY AND PRESSURE MEANS

The product supply and pressure means includes a plurality of stacked plates 16 which define a primary product receiving chamber 18 (see FIG. 3), disposed below a hopper 20 containing a supply of the product to be dispensed.

Pressure means, generally indicated by 22, is slidably disposed in primary product receiving chamber 18 for driving the food product within the chamber toward and into product metering means 12.

Linear reciprocation of pressure means 22 is effected through a pair of crank arms 24 each pivotally connected at one end to a shaft 26 which passes through the pressure means, and pivotally connected at their opposite ends to a pair of annular drive plates 28.

The drive plates are keyed to a common shaft 30 which is rotated by a worm and gear, not shown, operatively connected to the drive shaft 32 of a motor 34.

A cam 36 on one of the drive plates is adapted to intermittently contact a limit switch 38 for reversing drive motor 34.

Shaft 26 is rideable in slots 40 provided between a pair of the plates 16 of product supply and pressure means 10 to limit the range of linear movement of pressure means 22.

An extension 42 on one end of shaft 26, best seen in FIG. 3, extends outwardly from the adjacent crank arm 24 and has a plate 44 fixed thereto and depending therefrom.

The lower end of plate 44 is fixed to one end of a rack 46 which is disposed in spaced parallelism to product supply and pressure means 10.

Rack 46 is slidable relative to a support 48 mounted on base 14 and meshes with a gear 50 operatively connected to product metering means 12, all in manner and for purposes to appear.

Pressure means 22 includes a pair of primary rams 52 and a secondary ram 54 sandwiched therebetween, all slidably related to a carrier 56 which is in turn slidably related to the plates 16.

Carrier 56 comprises a pair of upstanding side walls 58 interconnected by a horizontally disposed center wall 60. A pair of ears 62 extend outwardly from side walls 58 and are adapted to ride in a slot, not shown, provided in one of the plates 16, with the side walls sliding along the walls of primary product receiving chamber 18.

The primary rams 52 and secondary ram 54 are U-shaped in elevation and include upper and lower arms 64 and 66 respectively connected at one end by a web 68, the arms of each ram being appropriately vertically spaced so as to be slidable relative to center wall 60 of carrier 56.

The secondary ram differs from the primary rams only in regard to the web 68 which is thicker in the case of the primary rams, wherefore the ends of the rams are staggered, with the end of secondary ram 54 being inset with respect to the ends of the primary rams for purposes to appear.

A slot 70 provided in each lower arm receives a pin 72 which extends between the side walls 58 of carrier 56, the pin and slot arrangement serving to limit the range of linear movement of the rams.

Each of the rams is spring-loaded by means of a compression spring 74 which bears at one end against the respective web 68 and is trapped at its opposite end in one of a trio of openings 76 provided in center wall 60 of carrier 56.

The springs of the primary and secondary rams are of different tensions. This fact, coupled with the staggering of the ends of the rams, makes it possible to exert different pressures on the product in primary product receiving chamber 18, as it is urged toward the product metering means.

THE PRODUCT METERING MEANS

Product metering means 12 includes a housing 80 releasably fixed as by bolts 81 to the ends of the plates 16 of product supply and pressure means 10 and having an inlet opening 82 in communication with primary product receiving chamber 18 of the latter.

Housing 80 is formed by a trio of upright plates 84 held in face-to-face relation as by bolts 86 and each having a central opening 88 extending laterally therethrough, the central openings of each plate being axially aligned as to each other.

A trio of metering wheels or discs 90 is journalled in th openings 88 of plates 84, the metering wheels also being disposed in face-to-face relationship and having a pair of spaced, parallel bores 92 which pass completely therethrough, the bores being axially aligned with and communicating with inlet opening 82.

The bores are formed by providing semi-circular grooves 94 in the mating faces of the metering wheels or discs 90.

A plug 96 is slidably disposed in each bore, the plug having a longitudinally disposed slot 98 extending therethrough through which a pin 100 freely passes, the pin being fixed relative to the metering wheels or discs as by a finger nut 101.

The pin and slots are so arranged that one end of each plug is always flush with the outer peripheries of the metering wheels, the plug ends being suitably curved to match the contours of the metering wheels.

The plugs are of such length as to provide secondary product receiving chambers 102 defined by bores 92 and one end of the plugs.

The lengths of the plugs and the sizes of the bores determine the sizes and capacities of secondary product receiving chambers 102. Thus, as these factors are varied, the amount and weight of food product accommodated by chambers 102 are accordingly varied.

Metering wheels 90 are adapted for rotation so that immediately following receipt by secondary product receiving chambers 102 of charges of food product, the metering wheels are rotated 180°, whereby the secondary product receiving chambers are moved from a 3 o'clock to a 9 o'clock position. Thus, the next charge of food product expelled from product supply and pressure means 10 into inlet opening 82 drives plugs 96 relative to bores 94 so as forcefully to expel the food product from secondary receiving chambers 102, and exteriorly of the product metering means through an exit opening 104 in housing 80 to such as product forming means or a suitable receptacle, not shown.

Because plugs 96 are slidably disposed in bores 92 of metering wheels 90, and because the metering wheels are adapted for 180° rotation, the secondary product receiving chambers are moved intermittently between the 3 o'clock position (wherein a charge of food product is received therein) and a 9 o'clock position (wherein the food product is discharged therefrom).

Rotation of the metering wheels is effected by the rack 46 and gear 50, the gear being mounted on one end of a shaft 106 which is fixed at its opposite end to the metering wheels.

A unidirectional clutch, not shown, disposed on shaft 106, permits rotation of the metering wheels in only one direction.

A stop 108 fixed to rack 46 is engageable in cut-outs 110 provided in the periphery of a stop 112 fixed to shaft 106 whereby movement of the rack is stopped at the precise moment necessary to position bores 92 and secondary product receiving chambers 102 of metering wheels 90 in exact alignment with inlet opening 82 of housing 80.

Linear movements of the rams of the pressure means 22 are timed with the rotative movements of the metering wheels, whereby the bores of the metering wheels are always in proper position for receiving the charges of food products.

In addition, the machine may operate in conjunction with product shaping means, not shown, which will receive the charges of products ejected from the metering wheels and impart such as a spherical shape thereto.

I claim:

1. Apparatus for dispensing a food product comprising, in combination, product supply and pressure means comprising, a container for the food product defining a primary product receiving chamber, primary and secondary pressure means for unisonly exerting pressure upon the food product, product metering means communicating with the chamber and aligned with at least one of the primary and secondary pressure means for accepting a measured amount of the food product expressed from the chamber, and means for ejecting the measured amount of food product from the metering means, the primary and secondary pressure means comprising a trio of rams which intermittently exert pressure on the food product for driving same into the product metering means.

2. Apparatus for dispensing a food product according to claim 1, wherein the rams are disposed in side-by-side relation.

* * * * *